(12) United States Patent
Han et al.

(10) Patent No.: US 8,385,979 B2
(45) Date of Patent: Feb. 26, 2013

(54) SHARING ANTENNAS FOR INCREASED MULTIPLE-INPUT UPLINK RECEPTION

(75) Inventors: Allenn Han, Atlanta, GA (US); Ming-Ju Ho, Alpharetta, GA (US); Stalin Fernando Albanes, Atlanta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 13/448,809

(22) Filed: Apr. 17, 2012

(65) Prior Publication Data

US 2012/0202553 A1    Aug. 9, 2012

Related U.S. Application Data

(63) Continuation of application No. 12/332,964, filed on Dec. 11, 2008, now Pat. No. 8,180,404.

(51) Int. Cl.
  *H04M 1/00* (2006.01)
(52) U.S. Cl. .................. 455/562.1; 455/422.1
(58) Field of Classification Search ............... 455/562.1, 455/101, 422.1, 136, 575.3, 63.1, 13.3
See application file for complete search history.

(56) References Cited

U.S. PATENT DOCUMENTS

| | | | |
|---|---|---|---|
| 6,453,150 B1 * | 9/2002 | Yamamoto et al. .......... | 455/13.3 |
| 6,643,522 B1 * | 11/2003 | Young ........................ | 455/552.1 |
| 7,035,672 B2 | 4/2006 | Nakaya et al. | |
| 7,099,695 B1 * | 8/2006 | Ngan ......................... | 455/562.1 |
| 7,190,974 B2 * | 3/2007 | Efland et al. ............... | 455/562.1 |
| 2004/0162037 A1 * | 8/2004 | Shpak .......................... | 455/101 |
| 2006/0160563 A1 * | 7/2006 | Ku ............................... | 455/552.1 |
| 2008/0032632 A1 * | 2/2008 | Choi et al. .................... | 455/63.1 |
| 2008/0238807 A1 * | 10/2008 | Ibrahim et al. ................ | 343/876 |
| 2009/0042555 A1 * | 2/2009 | Zhu et al. .................... | 455/422.1 |
| 2009/0068968 A1 * | 3/2009 | Rofougaran .................. | 455/136 |
| 2009/0156276 A1 * | 6/2009 | Rofougaran ............... | 455/575.7 |

OTHER PUBLICATIONS

OA dated Sep. 22, 2011 for U.S. Appl. No. 12/332,964, 17 pages.

* cited by examiner

*Primary Examiner* — Jean B Jeanglaude
(74) *Attorney, Agent, or Firm* — Turocy & Watson, LLP (57) ABSTRACT

Sharing antennas among carriers co-located at a base station such to increase throughput of the individual carriers is provided. Thus, the carriers can effectively receive multiple-input/multiple-output (MIMO) from mobile devices though the individual antennas of the carrier alone are not sufficient to receive such signals. A co-sharing interface is provided that takes signals from antennas of one carrier and forwards the signals to a second co-located carrier. In this regard, a carrier can receive signals from a related set of antennas as well as the co-sharing interface component (from a set of antennas related to a disparate carrier) and process the signals in conjunction. Thus, the signals can be disparate portions of a MIMO signal. In addition, the co-sharing interface can modify the signals as defined by the carrier receiving the signals from the interface, such as by applying gain control, alarming, bypass circuitry, and/or amplification.

20 Claims, 9 Drawing Sheets

SHARING ANTENNAS FOR INCREASED MULTIPLE-INPUT UPLINK RECEPTION

CROSS-REFERENCE TO RELATED APPLICATION

This application is a continuation of U.S. patent application Ser. No. 12/332,964, filed Dec. 11, 2008 and entitled SHARING ANTENNAS FOR INCREASED MULTIPLE-INPUT UPLINK RECEPTION, the entirety of which is incorporated herein by reference.

BACKGROUND

Advances in cellular phone and related network technology (e.g., microprocessor speed, memory capacity, data transfer bandwidth, software functionality, and the like) have generally contributed to increased cellular application in various settings. For example, today's cellular phones can perform many functions previously reserved for personal computers or other devices, such as web browsing, picture/video shooting, picture/video sharing, instant messaging, file sharing, and the like. As cellular phone capabilities increase, which can also increase demand for the capabilities, networks and protocols are developed to effectively support the capabilities. For example, while global system for mobile communications (GSM) was sufficient to handle functionality of cellular phones a few years ago, other technologies, such as universal mobile telecommunications system (UMTS), which is based from the third generation (3G) standard, have been developed to accommodate larger transfer rates between device and network.

More recently, fourth generation (4G) technologies have been developed, such as third generation partnership project (3GPP) long term evolution (LTE), worldwide interoperability for microwave access (WiMAX), and the like. These technologies provide even further increases in data throughput between mobile device and network, which allows for a vast array of supported device functionalities. In one example, the increased throughput is facilitated by allowing multiple-input/multiple-output (MIMO) communication between device and network such that a device can communicate with a network node, such as a base station, using multiple antennas to simultaneously transmit and receive signals. This requires the device and network node to have multiple antennas to support MIMO communication. Many existing base stations, however, do not have enough antennas to support the amount of MIMO bandwidth required for 4G technologies. In addition, base stations that do have enough antennas typically partition antennas to a number of service providers decreasing the number of usable antennas for a given provider. Antennas could be replaced on the base stations to support MIMO for the 4G technologies, but this can be expensive and can disturb currently supported 2G/3G technologies since the base station can be limited in physical space for installing additional antennas.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to providing multiple-input uplink reception for base stations at least in part by sharing antennas on a base station. In particular, multiple-input signals can be received by an antenna operated by an intended service provider as well as a disparate antenna on the base station (or within a proximity thereof). Portions of the signal received by the disparate antenna can be forwarded to a receiver related to the intended service provider to allow processing of the multiple-input signal. In this regard, a service provider's capability for supporting multiple-input communications is increased by the capability of the disparate antenna. It is to be appreciated that more than one disparate antenna can be utilized, and service providers can co-share antennas to allow maximum benefit for receiving the multiple-input signals.

In one example, the co-sharing functionality can be implemented at the base station using an interface, device, and/or the like to route signals from a receiver related to a first antenna to a receiver related to a second antenna. The co-sharing functionality, for instance, can be deployed with a receiver air interface tray (RX-AIT) that provides multiport connection from the first antenna to a related receiver. Thus, the RX-AIT can be utilized to additionally provide connection to the receiver from a disparate antenna. In addition, the co-sharing can be implemented with various modifications, including isolators, amplifiers, bypass devices, gain controllers, alarming devices, and/or the like, as described herein.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "data store," "engine," "template," "manager," "network," "profile," and the like are intended to refer to a computer-related entity, either hardware, software (e.g., in execution), and/or firmware. For example, a component can be a process running on a processor, a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Figure 1:
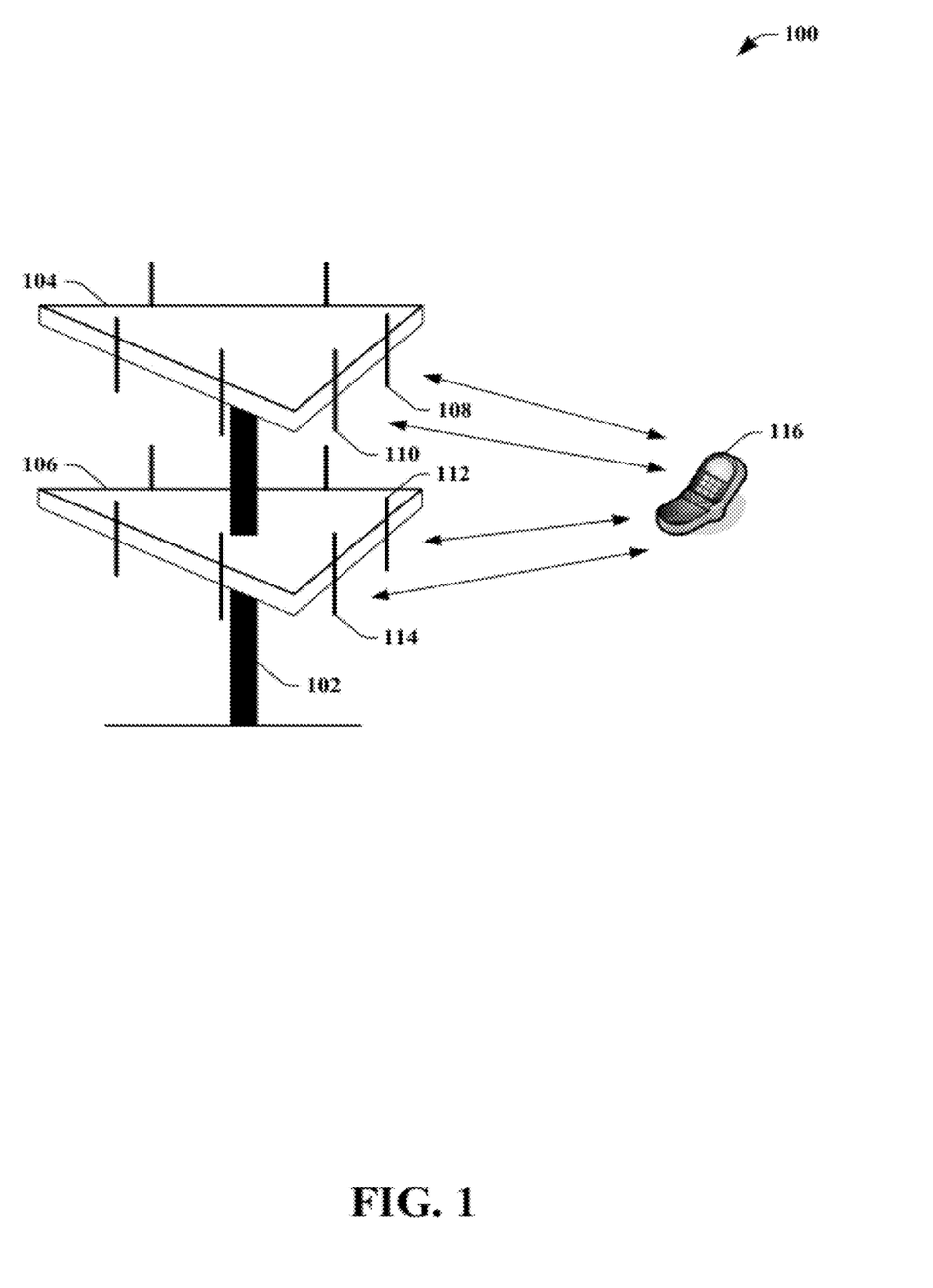
FIG. 1 illustrates an exemplary system that facilitates co-sharing antennas between co-located carriers.

Now turning to the figures, FIG. 1 illustrates a system 100 that facilitates sharing antennas in wireless communications to receive multiple-input/multiple-output (MIMO) signals. The system 100 includes a base station 102 that communicates with and provides wireless communication services to one or more mobile devices 116. The base station 102 can comprise multiple carriers 104 and 106, which can each be operated by a wireless service provider. The carriers 104 and 106 can each have a plurality of antennas, which can be grouped to implement a communication sector. For example, the first carrier 104 can have three groups of antennas, as shown, including antenna 108 and antenna 110 in one group. Similarly, carrier 106 can have grouped antennas, where antenna 112 and antenna 114 are grouped to form a sector. The wireless device 116 can travel over a geographic area where sector can be contiguous with other sectors such that the wireless device 116 can receive service from a given sector at a given point in time.

The wireless device 116 can be substantially any device connected to a network, such as a personal computer, server, personal digital assistant (PDA), cellular phone, smart phone, media player, digital video recorder (DVR), gaming console, router, network bridge, network gateway, printer, projector, scanner, camera, and/or the like. The wireless device 116 can participate in substantially any type of network, including a wired or wireless network local area network (such as Ethernet, universal serial bus (USB), Wi-Fi (IEEE 802.11b), etc.), wide area network, cellular network (such as a third generation partnership project (3GPP) network, global system for mobile communication (GSM), general packet radio service (GPRS), etc.), Bluetooth, radio frequency identification (RFID) network, or similar close quarter network technology, and/or the like.

The wireless device 116 can communicate with the carriers 104 and 106 using the antennas. For example, the wireless device 116 can receive information from the antenna 108 and/or 110 and transmit information to the antenna 110 and/or 108. It is to be appreciated that both carriers 104 and 106 can receive communications from the wireless device 116, though one (or both) of the carriers may ignore the signals where the wireless device 116 does not receive service from the carrier. Selecting signals from the wireless device 116 to receive and/or ignore can be performed based at least in part on evaluating a frequency range of the signal, a header or other protocol parameter of the signal, a periodicity of the signal, and/or the like, for example. Communications between the wireless device 116 and one or more of the carriers 104 and/or 106 can occur using time division duplex (TDD), frequency division duplex (FDD), orthogonal frequency division multiplex (OFDM) and/or similarly multiplexed signals to facilitate increased throughput, for example.

The dual antenna support, as depicted at each carrier 104 and 106 for a given sector, can be sufficient to support second generation (2G) and third generation (3G) technologies, such as global system for mobile communications (GSM), universal mobile telecommunications system (UMTS), etc. However, as technology advances, as described, increased throughput can be required to effectively support aspects thereof. For example, fourth generation (4G) technologies, such as third generation partnership project (3GPP) long term evolution (LTE), worldwide interoperability for microwave access (WiMAX), and related technologies, require multiple-input/multiple-output (MIMO) to effectively deliver content to and from wireless devices 116. In one example, MIMO can be required to support 64-quadrature amplitude modulation (64-QAM) utilized to modulate signals in 3GPP LTE. Such complicated modulation schemes can require increased signal-to-noise ratio, which can be achieved using MIMO. Though previous solutions include providing base stations to support the technology, the subject matter described herein allows current base stations to support increased throughput by sharing antennas between carriers. It is to be appreciated that the subject matter described can be implemented not only to support MIMO for 4G technologies using 2G/3G base stations, but also to support further advances where sharing antennas among carriers of a base station provides increased throughput to support advances in technological service offerings.

To achieve this functionality, according to an example, carriers 104 and 106 can share antennas such that MIMO signals can be received. In this regard, for example, the antennas 108, 110, 112, and 114 can receive signals from the wireless device 116. Where carrier 104 supports communication with the wireless device 116, for example, carrier 106 can forward signals received from the wireless device 116 over antennas 112 and/or 114 to carrier 104 for processing; the carrier 104 can process the signals in conjunction with signals received over the antennas 108 and 110. In another example, where carrier 106 supports communication with the wireless device 116, signals received at antennas 108 and 110 can be forwarded to carrier 106 for processing along with signals received over the antennas 112 and 114 of the carrier 106. In another example, the carriers 104 and 106 can co-share antennas to provide increased throughput for both carriers. This can be accomplished using a co-sharing interface, as described in further detail below.

Figure 2:
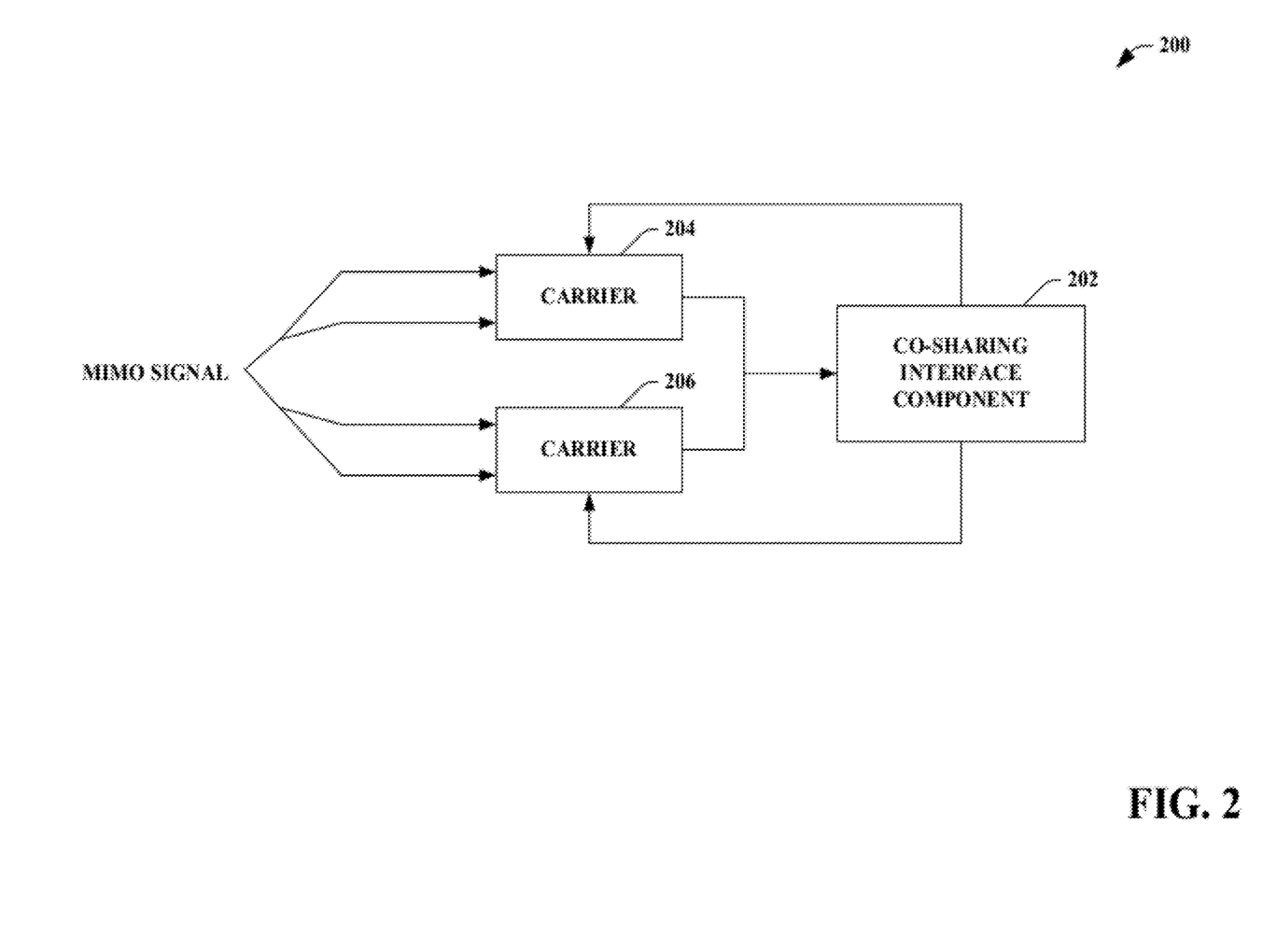
FIG. 2 illustrates a block diagram of an exemplary system that facilitates sharing antennas of one or more carriers to effectively receive MIMO signals.

Referring now to FIG. 2, a system 200 that facilitates co-sharing antennas in wireless communication to allow MIMO communication is illustrated. The system 200 includes a co-sharing interface component 202 that can route incoming signals from carrier 204 to carrier 206 and/or vice versa. Carrier 204 and carrier 206 can be related to disparate service providers co-located on a shared base station or base stations that are communicatively coupled (e.g., in close proximity, linked by backhaul, etc.), in one example, such that the carriers 204 and 206 can receive signals from a plurality of devices and can distinguish between the devices to provide wireless access to devices that utilize the appropriate service provider network. It is to be appreciated that the carriers can utilize various mechanisms to distinguish between the devices, such as frequency band utilized, protocol parameters, transmission periodicity, and/or the like. Moreover, the carriers 204 and 206, in one example, can employ a number of antennas to implement a sector within which the carriers can provide wireless access to devices by receiving and/or transmitting signals over the antennas.

As described, in one example, carrier 204 and carrier 206 can independently support 2G/3G network technologies using two or more antennas per sector. Introduction of higher demand technologies, however, can require additional throughput to effectively provide advertised services. In this regard, the co-sharing interface 202 can allow the carriers 204 and 206 to share antennas to increase throughput for the carriers 204 and 206. Thus, as shown, a MIMO signal can be received at both carrier 204 and carrier 206, using two antennas at each carrier 204 and 206, for example. The co-sharing interface 202 can be utilized by the carriers 204 and 206, in one example, to forward the respective received signals to the other carrier (e.g., carrier 204 forwards its received portions of the MIMO signal to carrier 206 via the co-sharing interface 202 and/or vice versa).

Thus, in this example, the carriers 204 and 206 can double antenna throughput by leveraging antennas of the other carrier. It is to be appreciated that each carrier can have N antennas shared using the co-sharing interface to provide increased throughput at each carrier where N is an integer greater than 0. In addition, more carriers can be present on the shared base station, or within a close proximity, and the carriers can be shared via the co-sharing interface 202 further increasing antenna throughput at each carrier (e.g., carrier 204 can utilize antennas from carrier 206 as well as substantially any additional carriers). It is to be appreciated that the co-sharing interface can be installed at a base station where carrier 204 and carrier 206 are co-located. In another example, where carrier 204 and carrier 206 exist at disparate base stations, the co-sharing interface can be installed at one or the other base station or at a neutral location. In this example, the disparate base stations housing the disparate carriers 204 and 206 can communicate over a backhaul or other broadband link to efficiently exchange signal information from respective antennas.

Figure 3:
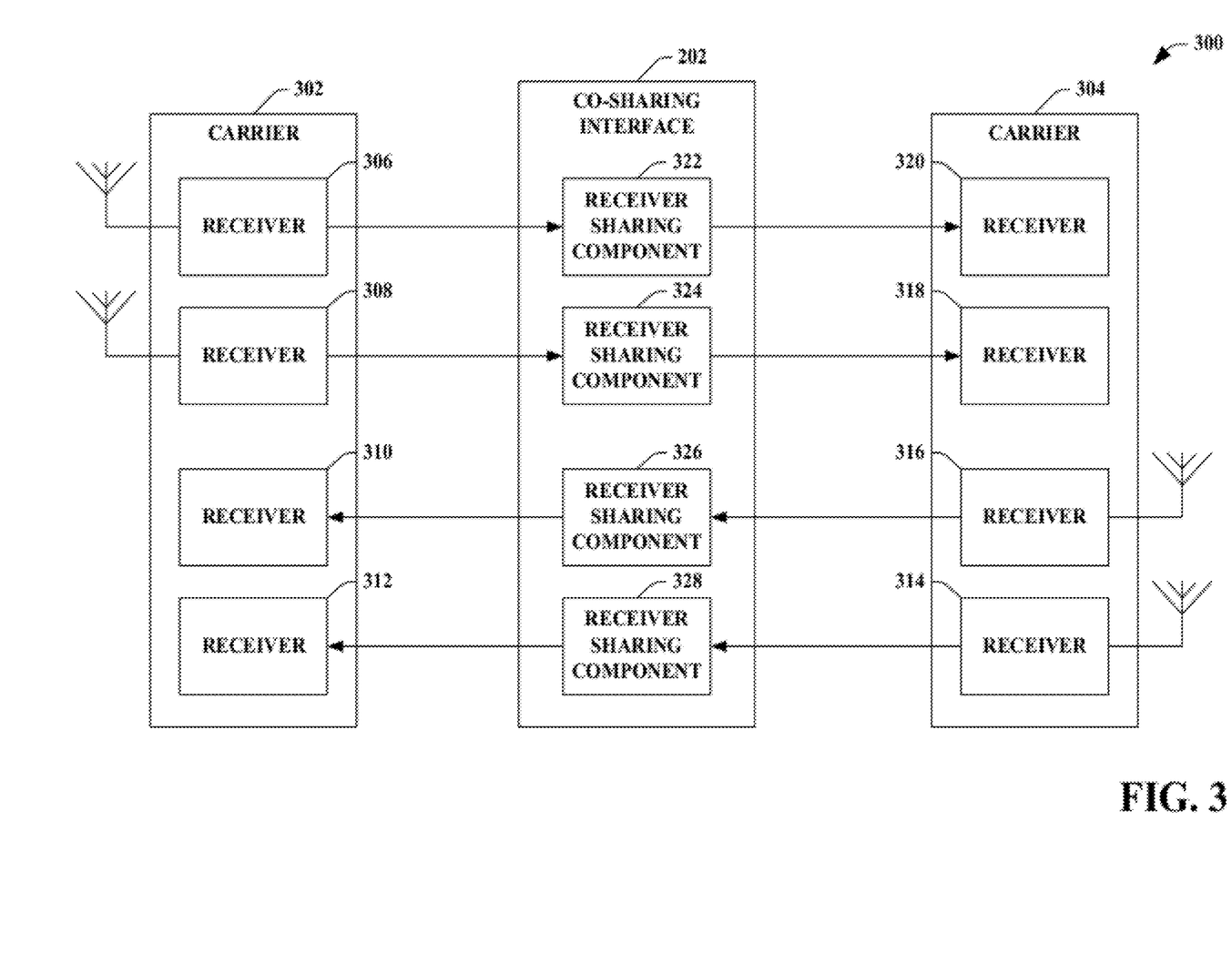
FIG. 3 illustrates a block diagram of an exemplary system that facilitates sharing received signals among carriers of a wireless network.

Turning now to FIG. 3, illustrated is a system 300 for co-sharing antennas between multiple carriers in a wireless communications network to provide MIMO support over antennas of the carriers. The system 300 includes a co-sharing interface 202 that communicates with carrier 302 and carrier 304 to allow antenna sharing between the carriers. Carrier 302 can comprise a plurality of receivers, including receiver 306 and receiver 308, which are coupled to antennas that can be utilized to receive wireless signals as described. In addition, carrier 302 can comprise receiver 310 and receiver 312 that can be utilized to receive other signals, as described below. Similarly, carrier 304 can comprise receiver 314 and receiver 316 that are coupled to antennas as well as receiver 318 and receiver 320 that can receive other signals. It is to be appreciated that the carriers 302 and 304 can comprise additional receivers, that can be coupled to antennas or utilized for receiving other signals, such as signals from a co-sharing interface 202, as described herein, signals from 2G/3G networks, E911 location measuring unit (LMU) signals, and/or the like. In one example, the carriers 304 and/or 306 can utilize a receiver air interface tray (RX-AIT) to receive and process the various signals.

In addition, as depicted, the co-sharing interface can comprise a plurality of receiver sharing components 322, 324, 326, and 328, which can receive signals from a given carrier and forward the signal to a disparate carrier to facilitate antenna sharing, as described. The receiver sharing components 322, 324, 326, and 328 can be isolators that permit radio frequency energy in only one direction (as shown) while absorbing energy from the other direction. In this regard, for example, receiver 306 and receiver 308 can receive at least a portion of a MIMO signal from antennas. The receiver sharing component 322 can forward the portion received at receiver 306 to receiver 320 of carrier 304, and receiver sharing component 324 can likewise forward the portion received at receiver 308 to receiver 318 of carrier 304. In addition, receiver 314 and receiver 316, of carrier 304, can receive another portion of the MIMO signal over antennas. Thus, carrier 304 can leverage the antennas of carrier to receive both portions of the MIMO signal increasing available throughput. In addition, for example, the portion of the MIMO signal received at receiver 314 and receiver 316 can be forwarded to receiver 310 and receiver 312 of carrier 302 respectively using receiver sharing components 326 and 328. Thus, carrier 302 can also receive both portions of the MIMO signal for further processing.

In this regard, the carriers 302 and 304 can co-share antennas such that both carriers can receive portions of a MIMO signal from local antennas and antennas of the other carrier. As described, carrier 302 and carrier 304 can support disparate wireless service providers such that one or both of the carriers 302 and 304 can ignore the signals if the device from which the signals are received is not supported. It is to be appreciated that a multiport device, such as an RX-AIT (not shown), can be utilized between the antennas and receivers such that receivers of a given carrier 302 and/or 304 as shown can be supported by the RX-AIT. In this regard, the RX-AIT can receive the signals and output the signals to the appropriate receivers. Thus, co-sharing interface 202 can receive signals from the RX-AIT and provide the signals to the disparate carrier using the receiver sharing components 322, 324, 326, and 328, as shown. The RX-AIT, as described, can additionally separate signals for 2G/3G technologies, E911 LMU, and/or the like, providing the signals to the appropriate receiver.

Figure 4:
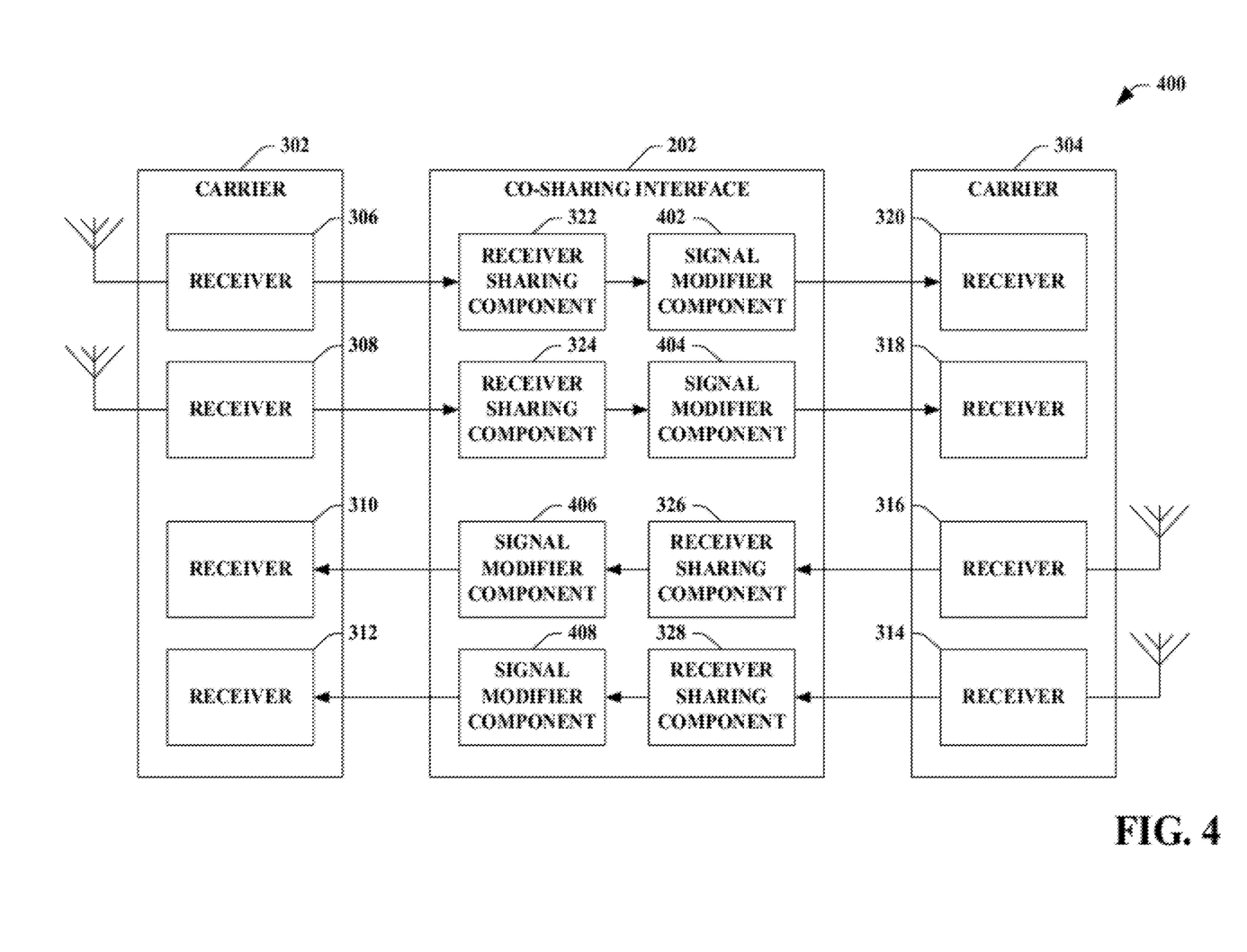
FIG. 4 illustrates a block diagram of an exemplary system that facilitates sharing and modifying received signals among carriers of a wireless network.

Turning now to FIG. 4, displayed is a system 400 that facilitates co-sharing antennas among carriers using additional signal modification. The system 400 includes a co-sharing interface 202 that allows carrier 302 and carrier 304 to share antennas increasing throughput for the carriers 302 and 304, as described. Carrier 302 can comprise a plurality of receivers 306, 308, 310, and 312. Similarly, carrier 304 can comprise a plurality of receivers 314, 316, 318, and 320. Receivers 306 and 308 can receive signals from antennas, as depicted, and receivers 314 and 316 can also receive signals from disparate antennas. In one example, the antennas from which receivers 306 and 308 receive signals can form a sector as can the antennas from which receivers 314 and 316 receive signals, as shown in previous figures. In one example, the sectors can overlap, though each sector can be supported by a disparate wireless service provider.

The co-sharing interface 202 can also include receiver sharing components 322, 324, 326, and 328, as described previously, which can receive signals from receivers 306, 308, 314, and 316, respectively. The co-sharing interface 202, in this example, can additionally include signal modifier components 402, 404, 406, and 408, respectively coupled to the receiver sharing components 322, 324, 326, 328. The signal modifier components 402, 404, 406, and 408 can receive signals from the receiver sharing components 322, 324, 326, and 328, apply one or more modifications to the signals, and pass the modified signals to receivers 320, 318, 310, and 312, respectively. The modification can include substantially any signal modification, such as providing gain control, alarming, bypass circuitry, amplification (such as low noise amplification where cable loss from the disparate carrier is beyond a threshold), and/or the like. In one example, the signal modification can be utilized to protect the carrier and/or related base station. In addition, the carriers 302 and/or 304 can control the modifications used by their respective signal modifier components 402/404 and 406/408.

Thus, according to an example, the receivers 306 and 308 can receive a portion of a MIMO signal, which can be forwarded to receiver sharing components 322 and 324. The receiver sharing components 322 and 324 can modify the signal portions, as specified by carrier 304, in one example, using the signal modifier components 402 and 404. The signal modifier components 402 and 404 can subsequently transmit the modified signal to receivers 320 and 318 of carrier 304. In addition, the receivers 316 and 314 can receive a portion of the MIMO signal over antennas as shown. Thus, both portions of the MIMO signal can be received by carrier 304 for increased throughput, where the portion received by receivers 320 and 318 can be received at antennas related to carrier 302 and modified as specified by the carrier 304. Likewise, as described, signals received from antennas coupled to receivers 316 and 314 can be received by receiver sharing components 326 and 328, modified by the signal modifier components 406 and 408 according to specification by the carrier 302, and transmitted to receivers 310 and 312. Moreover, an RX-AIT can be employed to receive the signals and forward to the receiver sharing components, as described herein.

Figure 5:
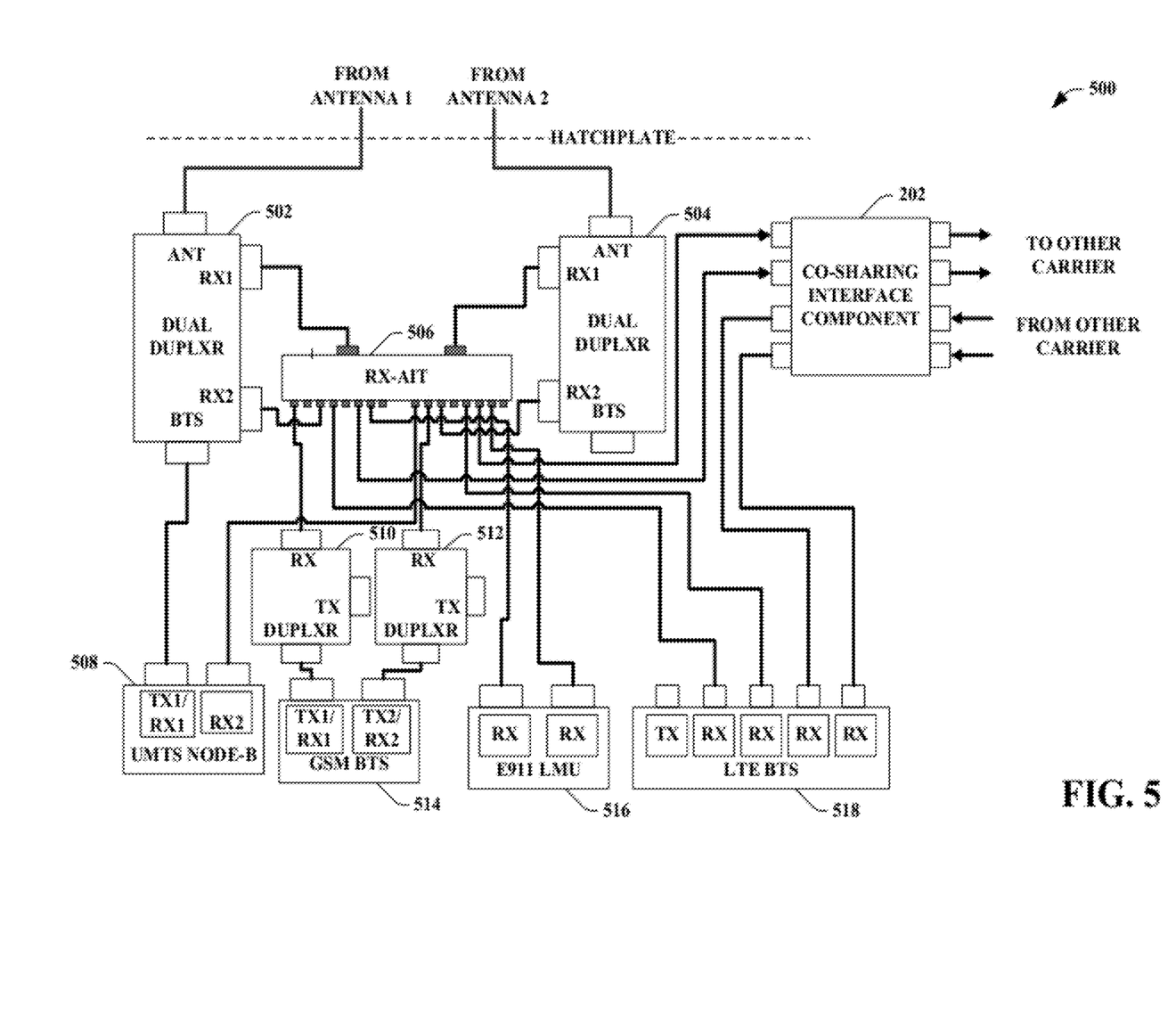
FIG. 5 illustrates a diagram of exemplary carrier of a wireless network that co-shares signals received over related antennas.

FIG. 5 illustrates a system 500 that facilitates co-sharing antennas among multiple carriers to allow processing of received MIMO signals. The system 500 includes dual duplexers 502 and 504 that are coupled to antennas to receive over the air signals. The system 500 also includes an RX-AIT 506 that receives the antenna signals from the dual duplexers 502 and 504, as depicted, and outputs to a plurality of receivers. One such receiver can be a UMTS Node-B 508 comprising dual receivers that can receive signals from each antenna through the RX-AIT 506. The UMTS Node-B 508 can process incoming signals according to the UMTS standard to provide wireless network access to one or more devices transmitting signals to the antennas. As shown, the UMTS Node-B 508 can also transmit signals back to the dual duplexer 502, using the base transceiver station (BTS) input, over antenna 1, which can be received by the one or more devices.

Similarly, for example, the RX-AIT 506 can output signals from the antennas to additional duplexers 510 and 512. In one example, the duplexers 510 and 512 can output the signals to a GSM BTS 514, which can provide GSM access to one or more devices by receiving the signals from the antennas and utilizing the duplexers 510 and 512 to transmit signals back to the one or more devices over the antennas. Likewise, the RX-AIT can send signals to an E911 LMU 516 that can broadcast the signals out to a plurality of devices or take other actions in response to receiving the message (e.g., notifying one or more networks or other devices over a backhaul link, etc.). The system 500 can also include a 3GPP LTE BTS 518 that receives the signals from the RX-AIT 506. The 3GPP LTE BTS 518 can also receive signals from the co-sharing interface component 202.

As described, the signals received from the co-sharing interface component 202 can come from another carrier, which can operate a different multi-band antenna. Thus, MIMO signals can be received from devices by the antennas connected to the dual duplexers 502 and 504 as well as disparate antennas. The 3GPP LTE BTS 518 can receive the signal portions from the antennas connected to the dual duplexers 502 and 504 as well as the portions received at the disparate carrier through co-sharing interface component 202. The 3GPP LTE BTS 518 can combine the signals to produce the resulting MIMO signal for processing, in one example. In this regard, the 3GPP LTE BTS 518 has four inputs (2 from the antennas, and 2 from the disparate carrier, as described), which can facilitate MIMO support for 3GPP LTE. In addition, the co-sharing interface component 202 can receive signals from the RX-AIT 506 and provide the signals to the disparate carrier for similar processing.

Thus, the disparate carrier (not shown) can also have a 3GPP LTE BTS or other component to process MIMO signals. In one example, substantially all signals can be forwarded from the RX-AIT 506 to the co-sharing interface component 202 (and similarly from the disparate carrier to the 3GPP LTE BTS 518 via the co-sharing interface component 202), and the receiving carrier can determine whether the signals are relevant for processing. It is to be appreciated that transmit portions can also be implemented, though not depicted for ease of explanation. In addition, though 2 antennas are shown, along with dual duplexers and a co-sharing interface component with 2 inputs at each end, a smaller or larger number of antennas can be similarly supported as described. Indeed, the number of antennas of each carrier can be N, where N is an integer greater than 0. In addition, a smaller or larger number of carriers can share antennas using the co-sharing interface. Thus, given M carriers, each having N antennas co-shared, each individual carrier can support MIMO signals with M*N inputs. Moreover, the disparate carriers can share a disparate number of antennas, in one example. In this regard, though a first carrier may share two antennas with a second carrier, the second carrier may only share one antenna with the first, for example.

Figure 6:
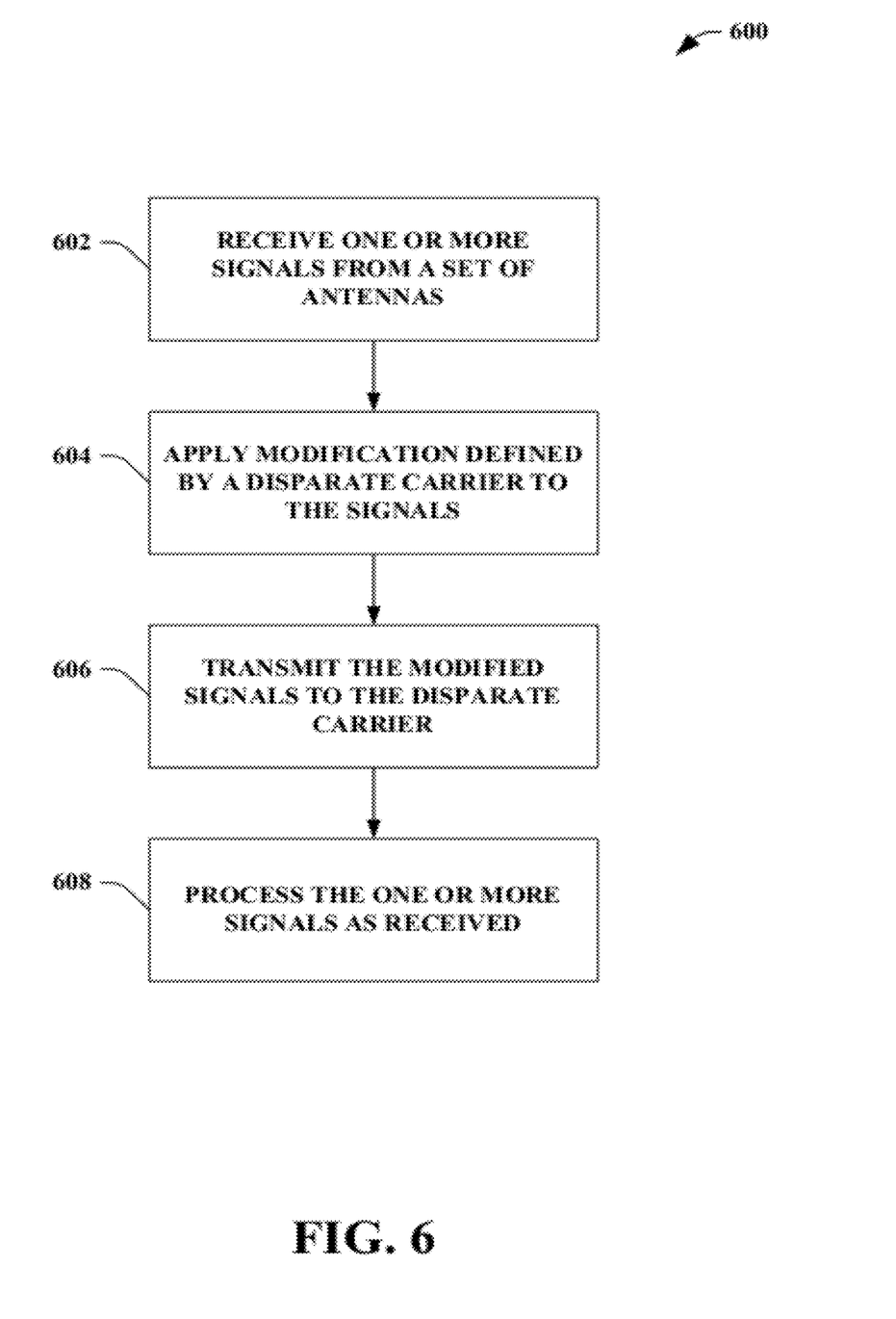
FIG. 6 illustrates an exemplary methodology for transmitting signals received at a first carrier to a second carrier.
Figure 7:
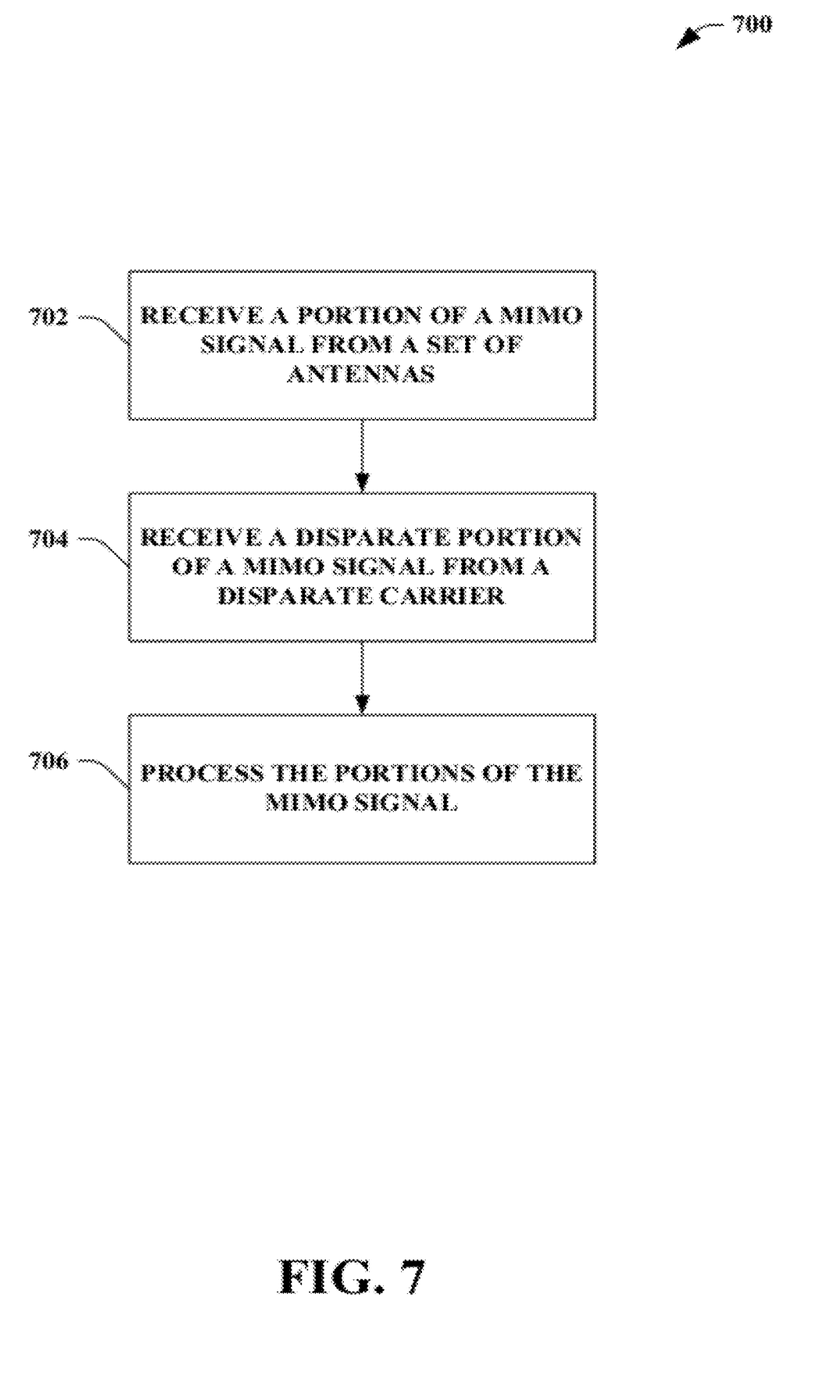
FIG. 7 illustrates an exemplary methodology that facilitates receiving and processing signals from a disparate carrier along with signals received over a set of antennas.
Figure 8:
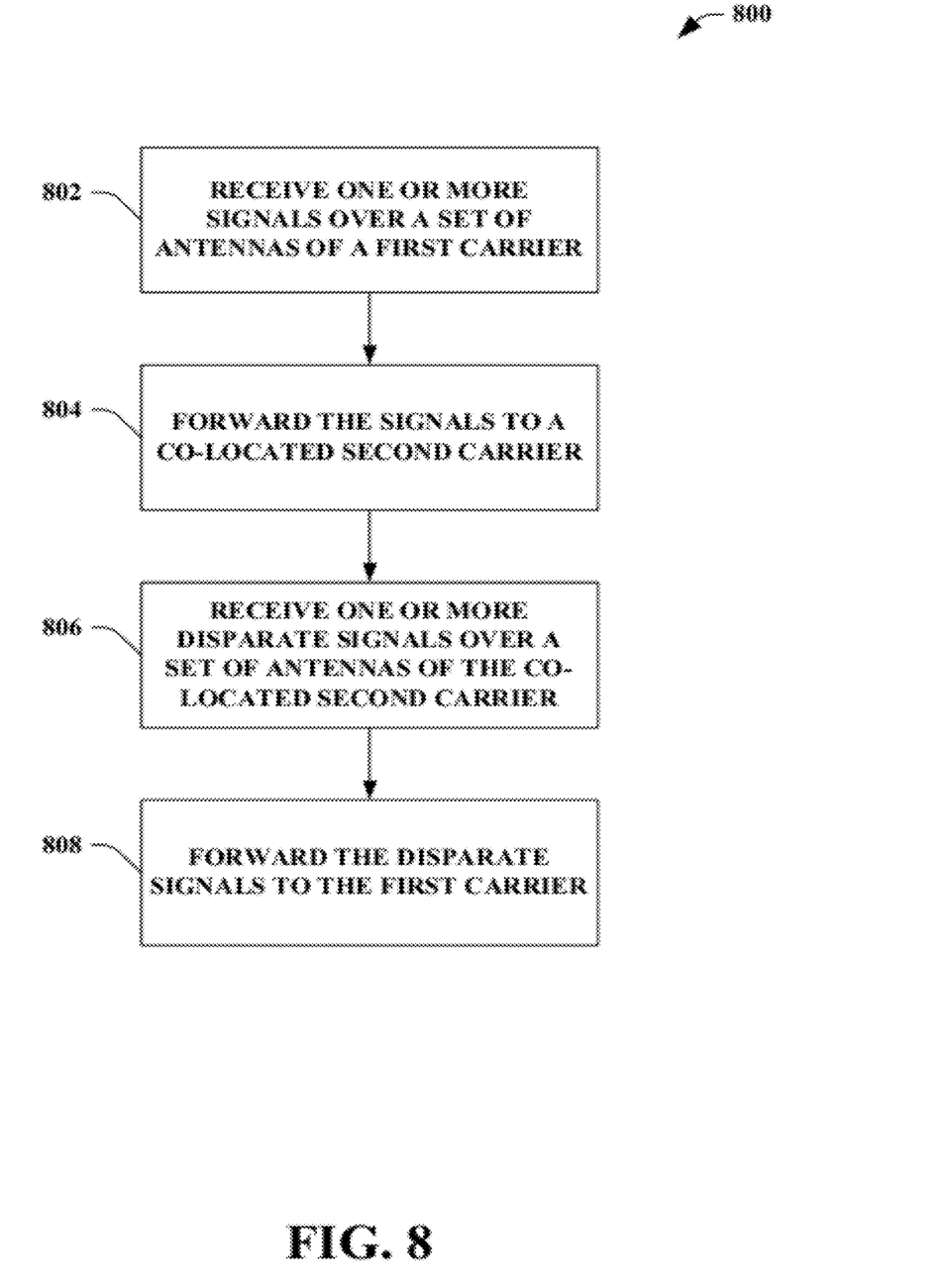
FIG. 8 illustrates an exemplary methodology for co-sharing signals received over antennas of disparate carriers to facilitate increased throughput at the carriers.

FIGS. 6-8 illustrate methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts. For example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 6 illustrates a methodology 600 that facilitates forwarding signals received from a set of antennas to another carrier to allow receipt of MIMO signals at the carrier. At 602, one or more signals are received from a set of antennas. The signals can be portions of a MIMO signal, as described previously. At 604, a modification defined by a disparate carrier can be applied to the signals. The modification, for example, can include applying gain control, alarming, bypass circuitry, amplification, and/or the like, to the signals. In addition, the modification can be defined by the disparate carrier such the carrier can receive the signals according to its specification. Thus, at 606, the modified signals can be transmitted to the disparate carrier. In one example, the signals can be transmitted using a co-sharing interface, as described previously. At 608, the one or more signals as received can be processed. Thus, substantially all signals can be forwarded to the disparate carrier whether or not the signals are processed at a carrier that originally receives the signals from a set of antennas. In one example, the processing can include determining the signals are not relevant. In another example, this determination can occur before applying modification and/or transmitting the signal such that if the signals are relevant, applying modification and transmitting may not be necessary.

Referring now to FIG. 7, illustrated is a methodology 700 for receiving signals obtained at one or more antennas related to a disparate carrier. At 702, a portion of a MIMO signal can be received from a set of antennas. As described, another set of antennas related to a disparate carrier can receive another portion of the MIMO signal. Thus, at 704, the disparate portion of the MIMO signal can be received from the disparate carrier. As described, the disparate portion can be received using an interface coupling the carriers, such as a co-sharing interface on a base station at which the carriers are co-located. At 706, the portions of the MIMO signal can be processed together to facilitate receiving MIMO signals over multiple antennas by co-sharing antennas among multiple carriers. Thus, MIMO communication with mobile devices can be achieved in this regard.

Now turning to FIG. 8, a methodology 800 that facilitates co-sharing antennas between multiple carriers for increased throughput at each carrier is displayed. At 802, one or more signals can be received over a set of antennas of a first carrier. The carrier, for example, can operate a multiple band antenna of a base station, which can have antennas to support multiple sector communications. At 804, the signals can be forwarded to a co-located second carrier on the base station, or in close proximity As described previously, the signals can be a portion of a MIMO signal that can be processed by the co-located second carrier along with signals received by antennas of the co-located second carrier. In addition, at 806, one or more disparate signals can be received over a set of antennas of the co-located second carrier and forwarded to the first carrier at 808. Thus, antennas can be co-shared among the carriers to increase bandwidth at the carriers.

Figure 9:
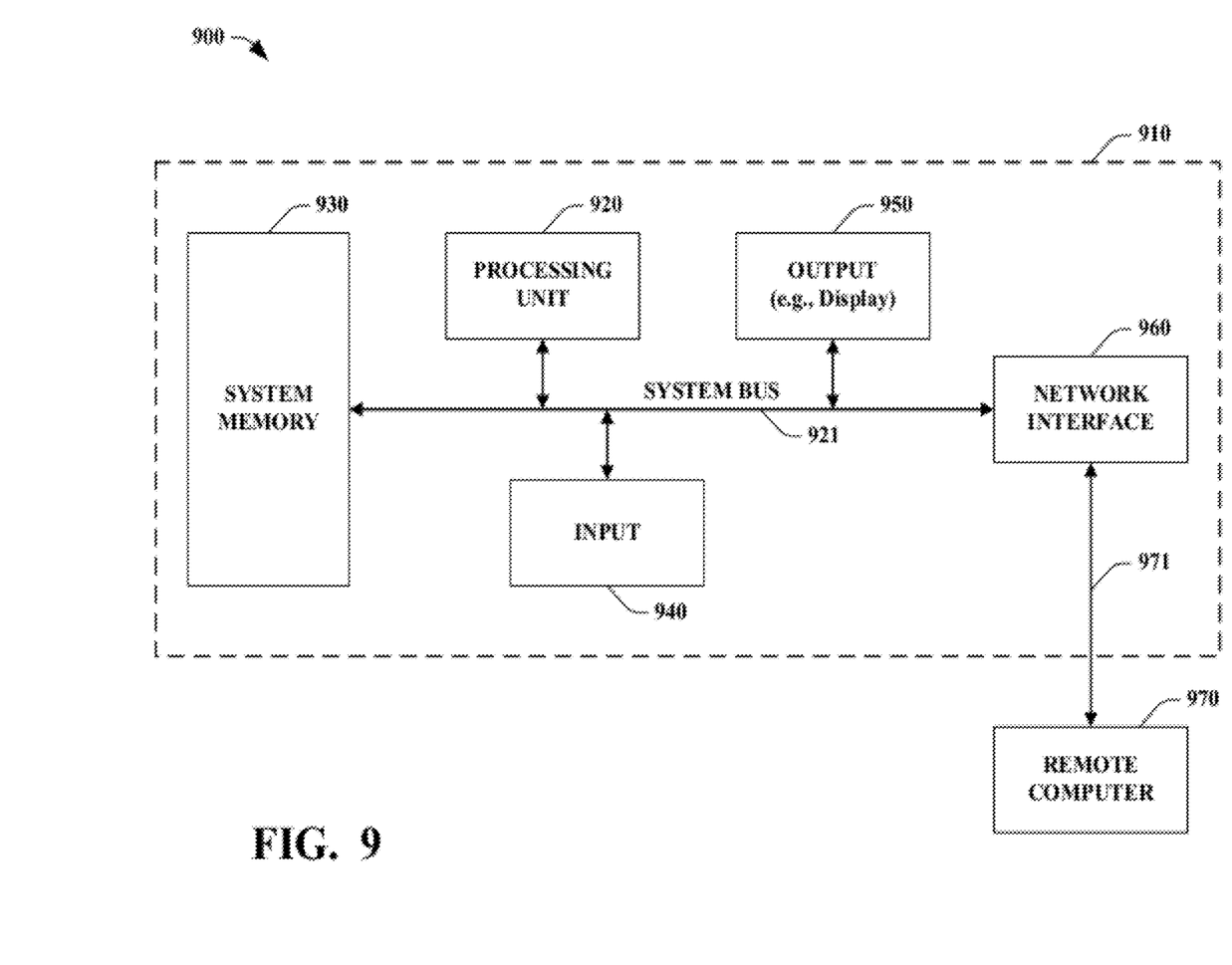
FIG. 9 is a block diagram of a computing system in which various aspects described herein can function.

In order to provide additional context for implementing various aspects of the claimed subject matter, FIG. 9 and the following discussion are intended to provide a brief, general description of a suitable computing environment in which the various aspects of the subject innovation may be implemented. In one example, a processor, firmware thereon, or other special purpose circuit (e.g., programmable logic controller (PLC), etc.) can implement the subject matter described herein. In another example, however, a co-sharing interface component can be implemented in a suitable computing environment, as described below. While the claimed subject matter has been described above in the general context of a circuit or processor/firmware implementation, those skilled in the art will recognize that the subject innovation can also be implemented as computer-executable instructions of a computer program that runs on a local computer, remote computer, and/or in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

Turning to FIG. 9, an example computing system or operating environment in which various aspects described herein can be implemented is illustrated. One of ordinary skill in the art can appreciate that handheld, portable and other computing devices and computing objects of all kinds are contemplated for use in connection with the claimed subject matter, e.g., anywhere that a network can be desirably configured. Accordingly, the below general purpose computing system described below in FIG. 9 is but one example of a computing system in which the claimed subject matter can be implemented.

Although not required, the claimed subject matter can partly be implemented via an operating system, for use by a developer of services for a device or object, and/or included within application software that operates in connection with one or more components of the claimed subject matter. Software may be described in the general context of computer executable instructions, such as program modules, being executed by one or more computers, such as client workstations, servers or other devices. Those skilled in the art will appreciate that the claimed subject matter can also be practiced with other computer system configurations and protocols.

FIG. 9 thus illustrates an example of a suitable computing system environment 900 in which the claimed subject matter can be implemented, although as made clear above, the computing system environment 900 is only one example of a suitable computing environment and is not intended to suggest any limitation as to the scope of use or functionality of the claimed subject matter. Further, the computing environment 900 is not intended to suggest any dependency or requirement relating to the claimed subject matter and any one or combination of components illustrated in the example operating environment 900.

With reference to FIG. 9, an example of a computing environment 900 for implementing various aspects described herein includes a general purpose computing device in the form of a computer 910. Components of computer 910 can include, but are not limited to, a processing unit 920, a system memory 930, and a system bus 921 that couples various system components including the system memory to the processing unit 920. The system bus 921 can be any of several types of bus structures including a memory bus or memory controller, a peripheral bus, and a local bus using any of a variety of bus architectures.

Computer 910 can include a variety of computer readable media. Computer readable media can be any available media that can be accessed by computer 910. By way of example, and not limitation, computer readable media can comprise computer storage media and communication media. Computer storage media includes volatile and nonvolatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 910. Communication media can embody computer readable instructions, data structures, program modules or other data in a modulated data signal such as a carrier wave or other transport mechanism and can include any suitable information delivery media.

The system memory 930 can include computer storage media in the form of volatile and/or nonvolatile memory such as read only memory (ROM) and/or random access memory (RAM). A basic input/output system (BIOS), containing the basic routines that help to transfer information between elements within computer 910, such as during start-up, can be stored in memory 930. Memory 930 can also contain data and/or program modules that are immediately accessible to and/or presently being operated on by processing unit 920. By way of non-limiting example, memory 930 can also include an operating system, application programs, other program modules, and program data.

The computer 910 can also include other removable/non-removable, volatile/nonvolatile computer storage media. For example, computer 910 can include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive can be connected to the system bus 921 through a non-removable memory interface such as an interface, and a magnetic disk drive or optical disk drive can be connected to the system bus 921 by a removable memory interface, such as an interface.

A user can enter commands and information into the computer 910 through input devices such as a keyboard or a pointing device such as a mouse, trackball, touch pad, and/or other pointing device. Other input devices can include a microphone, joystick, game pad, satellite dish, scanner, or the like. These and/or other input devices can be connected to the processing unit 920 through user input 940 and associated interface(s) that are coupled to the system bus 921, but can be connected by other interface and bus structures, such as a parallel port, game port or a universal serial bus (USB). A graphics subsystem can also be connected to the system bus 921. In addition, a monitor or other type of display device can be connected to the system bus 921 via an interface, such as output interface 950, which can in turn communicate with video memory. In addition to a monitor, computers can also include other peripheral output devices, such as speakers and/or a printer, which can also be connected through output interface 950.

The computer 910 can operate in a networked or distributed environment using logical connections to one or more other remote computers, such as remote computer 970, which can in turn have media capabilities different from device 910. The remote computer 970 can be a personal computer, a server, a router, a network PC, a peer device or other common network node, and/or any other remote media consumption or transmission device, and can include any or all of the elements described above relative to the computer 910. The logical connections depicted in FIG. 9 include a network 971, such as a local area network (LAN) or a wide area network (WAN), but can also include other networks/buses. Such networking environments are commonplace in homes, offices, enterprise-wide computer networks, intranets and the Internet.

When used in a LAN networking environment, the computer 910 is connected to the LAN 971 through a network interface or adapter. When used in a WAN networking environment, the computer 910 can include a communications component, such as a modem, or other means for establishing communications over the WAN, such as the Internet. A communications component, such as a modem, which can be internal or external, can be connected to the system bus 921 via the user input interface at input 940 and/or other appropriate mechanism. In a networked environment, program modules depicted relative to the computer 910, or portions thereof, can be stored in a remote memory storage device. It should be appreciated that the network connections shown and described are non-limiting examples and that other means of establishing a communications link between the computers can be used.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

There are multiple ways of implementing the present innovation, e.g., an appropriate API, tool kit, driver code, operating system, control, standalone or downloadable software object, etc. which enables applications and services to use the co-sharing techniques disclosed above. The claimed subject matter contemplates the use from the standpoint of an API (or other software object), as well as from a software or hardware object that operates according to the co-sharing techniques in accordance with the claimed subject matter. Thus, various implementations of the innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system, comprising:
   at least one memory storing computer-executable instructions; and
   at least one processor, communicatively coupled to the at least one memory, which facilitates execution of the computer-executable instructions to at least:
   receive a portion of a multi-input multi-output signal from a set of antennas associated with a first carrier network;
   modify the portion of the multi-input multi-output signal; and
   direct the modified portion of the multi-input multi-output signal to a set of receivers associated with a second carrier network,
   wherein the first carrier network provides wireless network access to a mobile device, and the second carrier network provides wireless network access to another mobile device.

2. The system of claim 1, wherein the at least one processor further facilitates the execution of the computer-executable instructions to control a gain of the portion of the multi-input multi-output signal.

3. The system of claim 1, wherein the at least one processor further facilitates the execution of the computer-executable instructions to process alarm data associated with the portion of the multi-input multi-output signal from the first carrier network.

4. The system of claim 1, wherein the at least one processor further facilitates the execution of the computer-executable instructions to amplify the portion of the multi-input multi-output signal from the first carrier network.

5. The system of claim 4, wherein the at least one processor further facilitates the execution of the computer-executable instructions to determine that a cable loss from the second carrier network exceeds a predetermined threshold, and in response to the cable loss from the second carrier network exceeding the predetermined threshold, apply low noise amplification to the portion of the multi-input multi-output signal from the first carrier network.

6. The system of claim 1, wherein the at least one processor further facilitates the execution of the computer-executable instructions to transmit the portion of the multi-input multi-output signal to the second carrier network.

7. The system of claim 1, wherein the at least one processor further facilitates the execution of the computer-executable instructions to permit conveyance of first radio frequency energy in a first direction, and absorption of second radio frequency energy in another direction.

8. A method, comprising:
   receiving, by a system including at least one processor, a portion of a multi-input multi-output signal from a set of antennas related to a first carrier network;
   applying, by the system, a modification to the portion of the multi-input multi-output signal resulting in a modified portion; and
   transmitting, by the system, the modified portion of the multi-input multi-output signal to a set of receivers related to a second carrier network.

9. The method of claim 8, wherein the applying the modification includes applying the modification to the portion of the multi-input multi-output signal based at least in part on a set of directions received from the second carrier network.

10. The method of claim 9, wherein the applying the modification includes controlling a gain of the portion of the multi-input multi-output signal.

11. The method of claim 9, wherein the applying the modification includes processing a representation of an alarm included in the portion of the multi-input multi-output signal.

12. The method of claim 9, wherein the applying the modification includes amplifying the portion of the multi-input multi-output signal.

13. The method of claim 12, wherein the amplifying the portion of the multi-input multi-output signal includes determining that a cable loss from the second carrier network exceeds a predetermined threshold, and in response to the cable loss from the second carrier network exceeding the predetermined threshold, applying low noise amplification to the portion of the multi-input multi-output signal from the first carrier network.

14. The method of claim 9, further comprising permitting conveyance of first radio frequency energy in a first direction, and absorbing of second radio frequency energy in another direction.

15. A tangible computer readable storage medium comprising computer executable instructions that, in response to execution, cause a computing system including at least one processor to perform a method, comprising:
receiving a first set of signals from a first set of antennas associated with a first carrier network;
forwarding the first set of signals to a first set of receivers associated with another carrier network;
receiving a second set of signals from a second set of antennas associated with the other carrier network; and
forwarding the second set of signals to a second set of receivers associated with the first carrier network.

16. The tangible computer readable storage medium of claim 15, wherein the forwarding the first set of signals to the first set of receivers includes modifying the first set of signals.

17. The tangible computer readable storage medium of claim 16, wherein the modifying the first set of signals includes modifying the first set of signals based at least in part on an instruction obtained from the other carrier network.

18. The tangible computer readable storage medium of claim 15, wherein the forwarding the second set of signals to the second set of receivers includes modifying the second set of signals.

19. The tangible computer readable storage medium of claim 18, wherein the modifying the second set of signals includes modifying the second set of signals based at least in part on an instruction obtained from the first carrier network.

20. The tangible computer readable storage medium of claim 15, wherein the receiving the first set of signals from the first set of antennas includes receiving a portion of a multi-input multi-output signal from the set of antennas associated with the first carrier network.

* * * * *